(12) United States Patent
Eberlein et al.

(10) Patent No.: US 11,720,342 B2
(45) Date of Patent: Aug. 8, 2023

(54) APPLICATION UPDATE WITH DATA-PRESERVING ROLLBACK

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 40 days.

(21) Appl. No.: 17/552,989

(22) Filed: Dec. 16, 2021

(65) Prior Publication Data

US 2023/0195443 A1    Jun. 22, 2023

(51) Int. Cl.
  *G06F 8/65* (2018.01)
  *G06F 16/27* (2019.01)
  *G06F 8/71* (2018.01)

(52) U.S. Cl.
  CPC .............. *G06F 8/65* (2013.01); *G06F 8/71* (2013.01); *G06F 16/27* (2019.01)

(58) Field of Classification Search
  None
  See application file for complete search history.

(56) References Cited

U.S. PATENT DOCUMENTS

| | | | |
|---|---|---|---|
| 9,361,093 B2 | 6/2016 | Meissner et al. | |
| 10,303,665 B2* | 5/2019 | Engelko | G06F 16/211 |
| 10,657,276 B2 | 5/2020 | Birn et al. | |
| 11,269,620 B1* | 3/2022 | Hoeft | G06F 8/656 |
| 2016/0085777 A1* | 3/2016 | Engelko | G06F 16/211 |
| | | | 707/803 |
| 2016/0239523 A1* | 8/2016 | Haferkorn | G06F 16/213 |
| 2016/0246833 A1* | 8/2016 | Eberlein | G06F 16/213 |
| 2017/0123787 A1* | 5/2017 | Burkhardt | G06F 8/656 |
| 2018/0285097 A1* | 10/2018 | Radermacher | G06F 8/656 |
| 2018/0336022 A1* | 11/2018 | Eberlein | G06F 8/71 |

(Continued)

OTHER PUBLICATIONS

Communication: "Extended European Search Report", dated Sep. 1, 2022 (dated Sep. 1, 2022), European Patent Office, for European Application No. 22164632.6-1203, 10pgs.

(Continued)

*Primary Examiner* — Philip Wang
(74) *Attorney, Agent, or Firm* — Buckley, Maschoff & Talwalkar LLC

(57) ABSTRACT

Systems and methods include execution of a first application associated with a first access schema and a first data model in a data schema of a database system. While the first application is receiving incoming user requests, the first data model in the data schema is extended based on a second data model of a second application, a second access schema of the second application is prepared in the database system, data of the first data model in the data schema is migrated to the second data model, data of the first data model in the data schema is replicated to the second data model while the first application is receiving incoming user requests, the second application is executed, the incoming user requests are re-directed to be received by the executing second application, and the replication of data of the first data model in the data schema to the second data model is stopped. While the second application is receiving incoming user requests, data of the second data model in the data schema is replicated to the first data model.

20 Claims, 12 Drawing Sheets

(56) References Cited

U.S. PATENT DOCUMENTS

2020/0159852 A1* 5/2020 Meissner ................ G06F 8/65

OTHER PUBLICATIONS

De Jong, Michael et al., "Zero-Downtime SQL Database Schema Evolution for Continuous Deployment", 2017 IEEE/ACM 29th International Conference on Software Engineering: Software Engineering in Practice Track, May 20, 2017 (May 20, 2017), (pp. 143-152, 10 total pages), XP0583399991, DOI 10.1109/ICSE-SEIP. 2017.5.

* cited by examiner

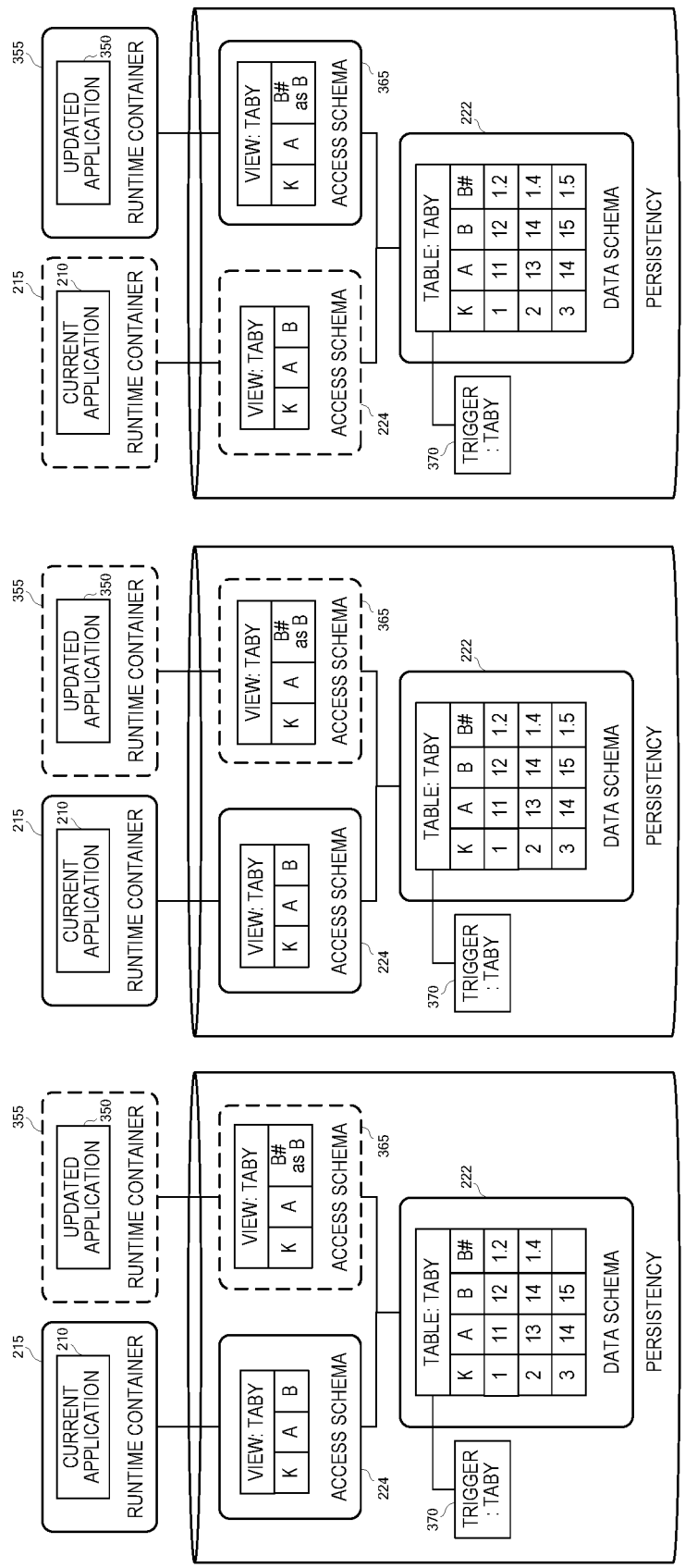

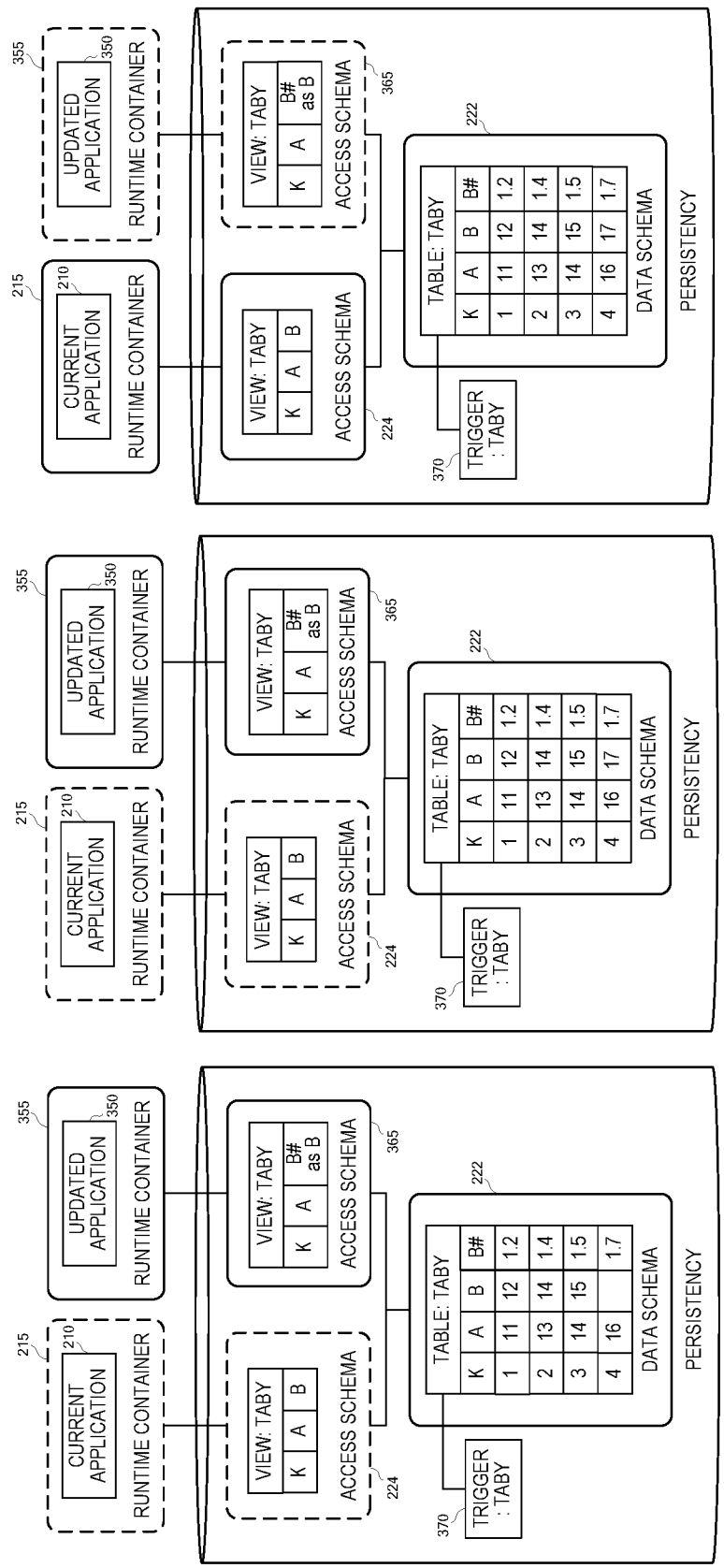

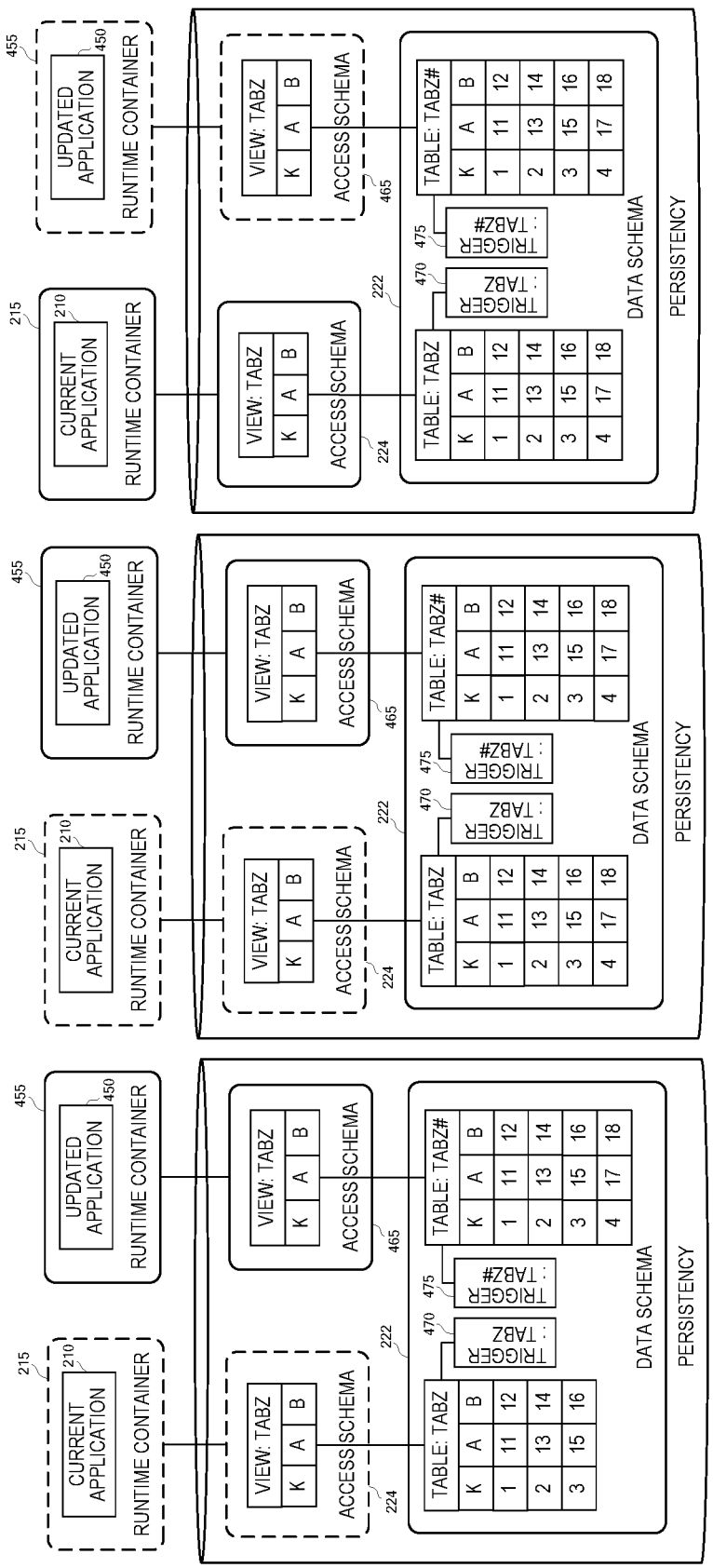

APPLICATION UPDATE WITH DATA-PRESERVING ROLLBACK

BACKGROUND

Conventional enterprises utilize many software applications to facilitate their operations. New versions of these applications are developed from time-to-time, which may include new features, optimizations and/or bug fixes. Various techniques have been employed to update an application to a newer version thereof.

A new version of a software application may change a persistency model associated with data instances managed by the application. Accordingly, updating to the new version requires updates to the corresponding persistent data. Conventionally, such updates to persistent data were performed during a downtime period in which the application to be updated is taken offline and is therefore unavailable to users. Depending on the amount of persistent data, the update may require a considerable amount of time, which may impact the enterprise negatively.

Recent techniques execute an update to an application while the application running (i.e., serving incoming user requests). These techniques create clones of the tables which are changed by the update and replicate data from the tables to the clones. Once the replicated data is verified, incoming user requests are switched to the updated application.

After the switch, the incoming requests will typically cause updates to the persistency. If an error in the update is then detected, it is possible to restore the persistency to a state prior to the switch and to re-direct incoming requests to the prior version of the application. The restoration of the database causes a loss of the data updates which occurred after the switch. In an alternative, the persistency is not restored and the incoming requests are simply directed to the prior version of the application. Since the prior version would be unaware of certain persistency changes (e.g., added columns or added tables), it would therefore be unable to read any data written thereto, also resulting in data "loss".

This data loss (i.e., either restoring the database to an earlier point in time or effectively disabling access to new columns or tables) may adversely affect data consistency within the software application and within the mesh of services and systems in conjunction with which the application operates. For example, if the application includes fields which require unique numbers for legal or other reasons, simply re-entering data will lead to new numbers for the same records. If data was created in other systems based on the lost data, the created data is no longer consistent. Even if the lost data is created anew, the corresponding foreign-key-relations may not be restored.

Systems are desired which facilitate reversion from an updated version of an application to a prior version of the application while reducing the likelihood of data loss. Such systems may also provide for evaluating and patching the updated version prior to switchover to the updated version.

BRIEF DESCRIPTION OF THE DRAWINGS

FIGS. 3A through 3H illustrate update of a current application to an updated application which changes a type of a column and writes to the column during the update process according to some embodiments.

FIGS. 4A through 4H illustrate update of a current application to an updated application which adds new records to a table during the update process according to some embodiments.

DETAILED DESCRIPTION

Figure 1A:
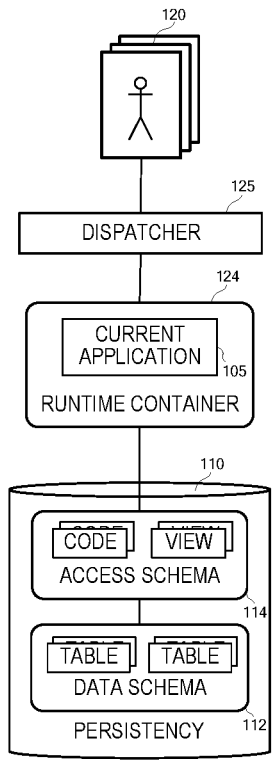
FIGS. 1A through 1D illustrate update of a current application to an updated application according to some embodiments.

The following description is provided to enable any person in the art to make and use the described embodiments. Various modifications, however, will remain readily-apparent to those in the art.

Some embodiments provide a system to rollback an update to a software application after users have commenced productive use of the updated application, such that data created during the productive use of the updated application is usable by the prior version of the application after the rollback. For example, some errors may become evident only after evaluating the read and write performance of the updated application. Embodiments allow initiation of a rollback as described above after determination of such an error. The erroneous update may then be patched and the above process may repeat—with users using the patched version to create new data and, if needed, rolling back to the prior version again without data loss.

FIGS. 1A through 1D illustrate update of a current application to an updated application according to some embodiments. The illustrated components may be implemented using any suitable combinations of computing hardware and/or software that is or becomes known. Such combinations may include cloud-based implementations in which computing resources are virtualized and allocated elastically. In some embodiments, two or more components are implemented by a single computing device.

Persistency 110 may comprise a database system as is known in the art. Persistency 110 may comprise a single node or distributed database system, and may be implemented using hardware such as but not limited to an on-premise computer server or a cloud-based virtual machine. Persistency 110 may be managed by program code of query-responsive database management system (DMBS). According to some embodiments, persistency 110 is an "in-memory" database, in which all data is loaded into memory upon startup and requested changes are made thereto. The changed data is flushed from time-to-time to persistency 11 to move older data versions from memory to persistent storage or to persist a database snapshot.

Persistency 110 stores database tables within data schema 112 and views on the database tables within access schema 114. Access schema 114 may also store program code of database procedures and other artifacts as in known in the art. The database tables of data schema 112 conform to a logical data model in a relational data schema 112 associated with current application 105.

Current application 105 comprises processor-executable program code executed within runtime container 124. Runtime container 124 and the execution environment may be provided by a server as is known in the art. The server may comprise, for example, a web server, an application server, a proxy server, a network server, and/or a server pool. The server accepts requests for application services and provides such services to any number of client devices.

Current application 105 and persistency 110 may comprise a production system which is deployed by an enterprise to service incoming user requests. During operation, users 120 request functionality, dispatcher 125 directs corresponding requests to current application 105 and, in turn, current application 105 issues corresponding queries to persistency 110. The queries may include read write statements which result in data being stored to, deleted from, and/or edited within persistency 110.

As shown in FIG. 1A, current application 105 is separated from data schema 112 by a first access schema 114. Access schema 114 contains a projection view for every database table in data schema 112, and application 105 queries the database tables via their corresponding views. A view in the access schema is an updatable projection view into a database table. Views are stackable in that one view may be a view of another one or more view.

In one example, a table T1 of data schema 112 includes fields F1-F5, and a projection view Table of access schema 114 defines fields F1-F4 of table T1. Consequently, a query received from current application 105 to retrieve records of view Table will result in retrieval of data from fields F1-F4 (and not F5) of table T1. Multiple views may define different sets of fields of a same table (e.g., [F1-F3], F2-F5], (F1, F3, F5]), and a single view may define fields of two or more database tables.

Multiple independent access schemas can be provided for a same data schema. For example, a first access schema may support communication between a first application and a first data model in a data schema, and a second access schema may support communication between a second application and a second data model in the same data schema. Such multiple access schemas may be used to support an update as described herein procedure.

Figure 1B:
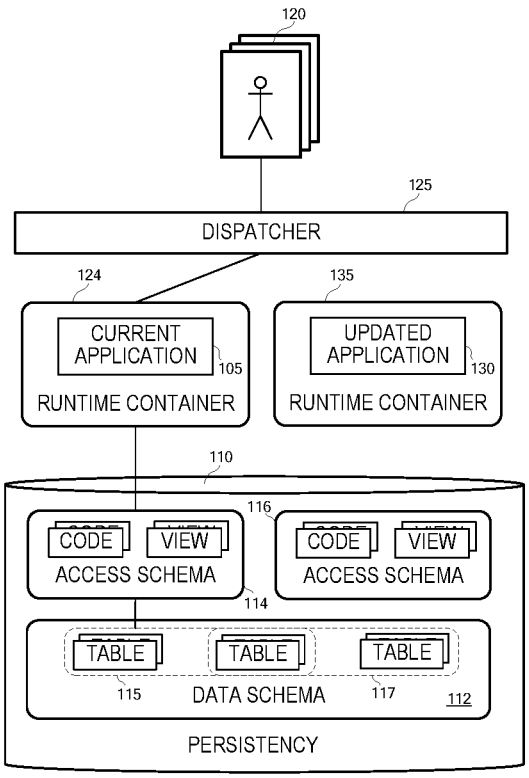

FIG. 1B illustrates the beginning of an update process according to some embodiments. The update process is intended to update current application 105 with updated application 130. It will be assumed that updated application 130 is associated with one or more changes to the data model in data schema 112. Accordingly, the update process begins by extending the data model in data schema 112 based on the changes defined by updated application 130. Examples of changes include adding a column to a database table, changing a type of a column, and/or cloning a table to accept new records generated by the updated application. After extension, schema 112 includes tables 115 accessible via access schema 114 and tables 117 which include a subset of tables 115.

A second access schema 116 is also prepared in persistency 110. The second access schema 116 contains projection view referencing tables 117 of data schema 112, and is intended for use by updated application 130 to access tables 117. In this regard, updated application 130 is also deployed to runtime container 135 to prepare updated application 130 for execution.

Next, data from tables 115 is replicated to those tables 117 which are not in common with tables 115, according to the defined data model of tables 117. Such replication may include transformation of data from a column of a table 115 to another column of a table 117. As shown in FIG. 1B, current application 105 continues to receive and service incoming requests prior to and during the replication. Accordingly, database triggers are set to ensure that any new data which should be replicated to the not-common tables 117 is replicated in order to keep the non-common tables 117 up-to-date.

Once the replication is complete (except for ongoing database trigger-initiated replications), tables 117 may be tested for consistency using "smoke tests" or other read operation-based data consistency tests that are or become known. Testing may include executing a test instance of updated application 130 within runtime container 135 to issue read statements to access schema 116. If the tests are not successful, updated application 130 and/or access schema 116 may be modified to correct any errors and similar testing may be run again. If errors continue, application 130, schema 116 and not-common tables 117 may simply be discarded, allowing productive operation to continue using current application 105 as shown in FIG. 1A.

Figure 1C:
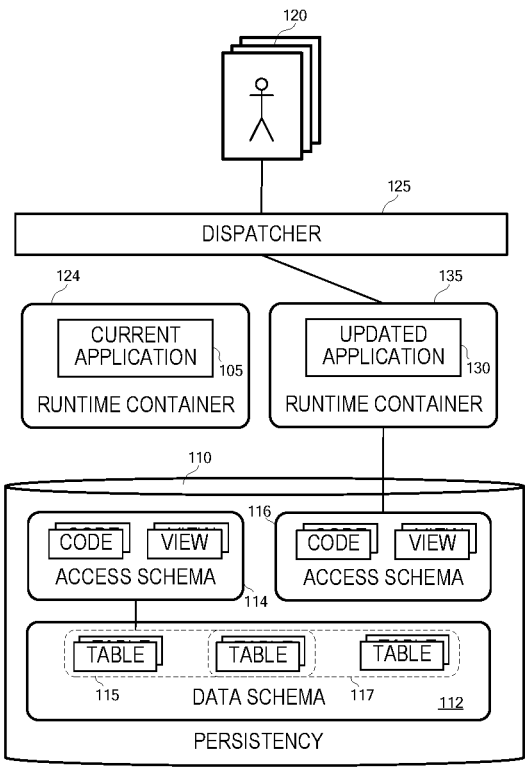

If the consistency tests are successful, dispatcher 125 is instructed to direct the incoming requests to updated application 130 as shown in FIG. 1C. Additionally, database triggers are activated to reverse the direction of the above-mentioned replication. As will be described in detail below, the reversal results in new data written to tables 117 during operation of updated application 130 to be replicated to corresponding ones of tables 115. Consequently, tables 115 remain up-to-date despite the lack of queries issued by current application 105 while incoming requests are being served by updated application 130.

Updating tables 115 during operation of updated application 130 as described herein allows an efficient rollback to current application 105. For example, if operation of updated application 130 as shown in FIG. 1C is determined to be unsatisfactory (e.g., due to errors or performance issues), dispatcher 125 may be instructed to direct the incoming requests back to application 105 as shown in FIG. 1B. Application 105 may then continue operation using the data generated during operation of application 130. As described above, the process may return from FIG. 1B to FIG. 1C after patching of application 130 and/or access schema 116, or to the configuration shown in FIG. 1A.

Figure 1D:
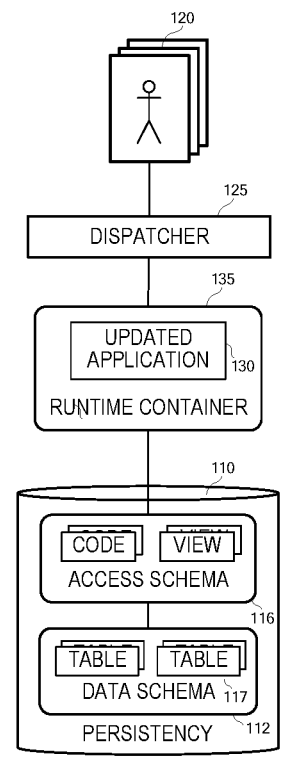

Once satisfactory operation of updated application 130 is verified, application 105, schema 114 and tables 115 which are not within tables 117 may be discarded. Productive operation thereby continues using updated application 130, schema 116 and tables 117 as shown in FIG. 1D.

Figure 2A:
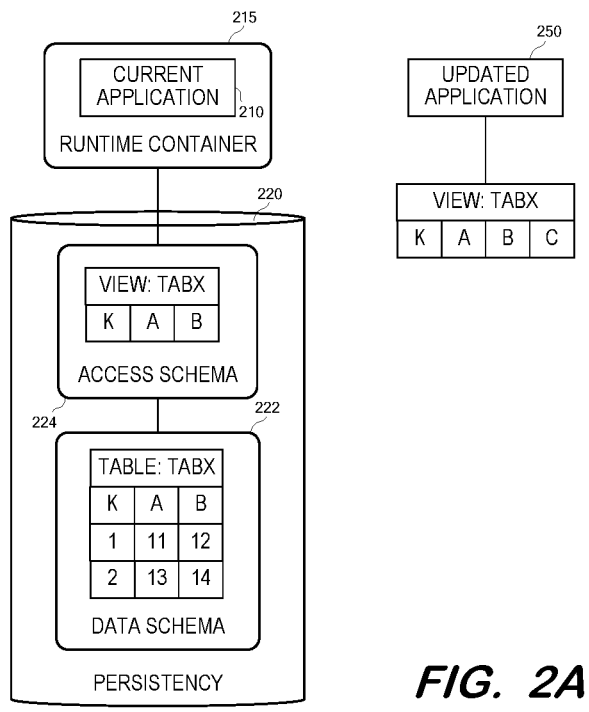
FIGS. 2A through 2E illustrate update of a current application to an updated application which adds a column to a table and writes to the column during the update process according to some embodiments.

FIGS. 2A through 2E illustrate update of current application 210 to updated application 250 according to some embodiments. It is assumed that current application 210 of FIG. 2A is executing within runtime container 215 based on incoming requests from users (not shown) during productive operation. Persistency 220 stores data schema 222 and access schema 224 associated with current application 210. Data schema 222 includes table TABX, in addition to other unshown tables. Similarly, access schema 224 includes view TABX on table TABX, in addition to other unshown views on other tables (and possibly other views on one or more columns of table TABX).

Figure 2B:
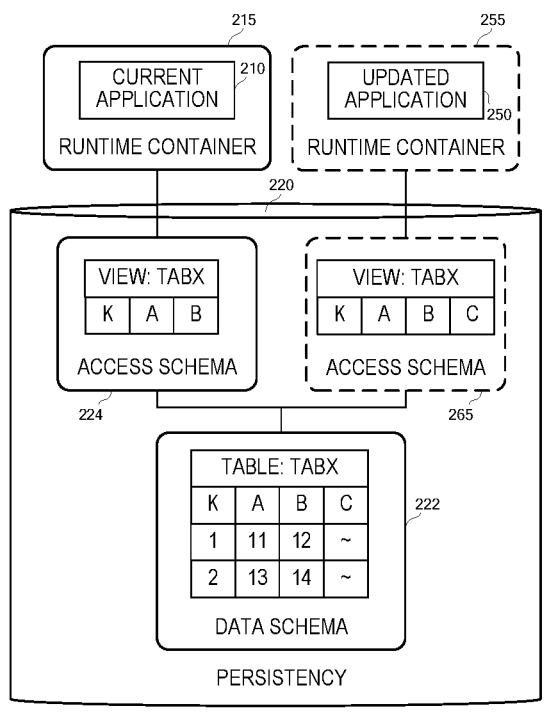

Updated application 250 requires the presence of column C within table TABX and accesses table TABX using view TABX which includes a column pointing to column C of table TABX. As mentioned above, an update process may include extension of an existing data model to satisfy the data model of an updated application. Accordingly, as shown in FIG. 2B, the data model in data schema 222 is extended to add a column C to table TABX. Since executing current application 210 is unaware of column C of table TABX, column C does not include data. As also shown in FIG. 2B, new access schema 265 is prepared within persistency 220 and updated application 250 is deployed to runtime container 255 configured to access the database via access schema 265. The dashed lines of FIG. 2B are intended to indicate that updated application 250 and access schema 265 are not being used to serve incoming user requests during productive operation.

Figure 2E:
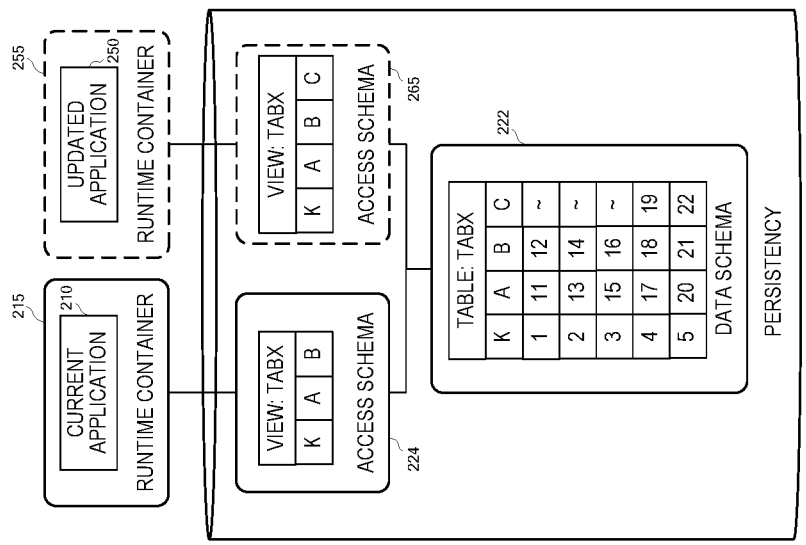
Figure 2D:
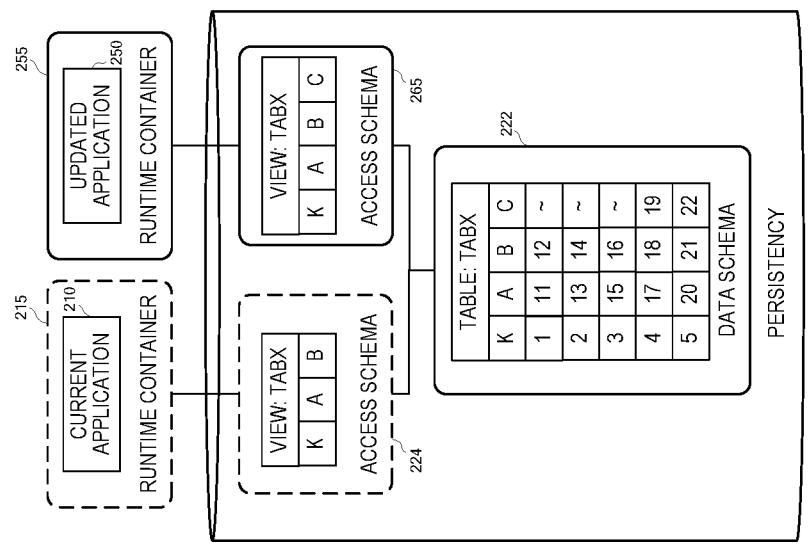
Figure 2C:
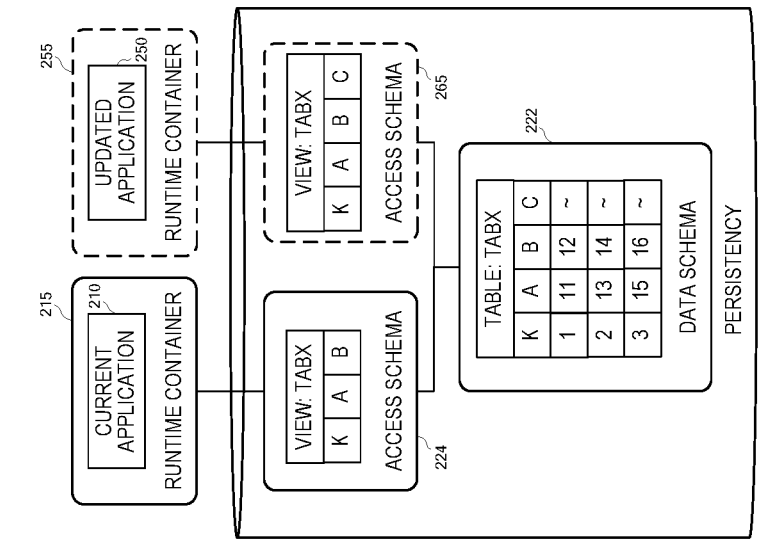

FIG. 2C illustrates table TABX after continued execution of application 210. As shown, additional rows have been added to table TABX by virtue of interactions between application 210 and access schema 224. The additional rows to not include values for column C.

It will be assumed that any migration of other table data (as will be described below) completes after the scenario shown in FIG. 2C. Moreover, it will also be assumed that any desired consistency checks of the migrated data are passed, resulting in redirection of incoming requests to updated application 250 executing within runtime container 255. Such requests may cause application 250 to interact with view TABX of access schema 265 which, as shown in FIG. 2D, results in the addition of two rows to table TABX of data schema 222. Since view TABX in access schema 265 includes new column C of table TABX, the added records include data for column C.

It will now be assumed that reversion back to application 210 is desired due to an error or other reason. FIG. 2E illustrates, by means of dashed and solid lines, the redirection of incoming requests to current application 210, resulting in use of current application 210 and access schema 224 to serve the incoming requests. During such operation, current application 210 may access the records of table TABX which were added during operation of updated application 250. However, current application 210 may only access columns K, A and B of the added records, because only those columns are referenced by view TABX of access schema 224.

Figure 3A:
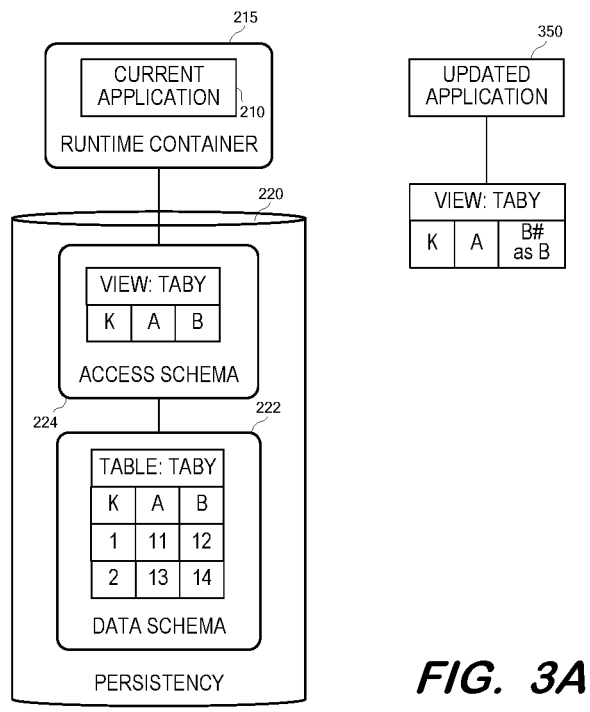

FIGS. 3A through 3H illustrate update of current application 210 to updated application 350 according to some embodiments. Current application 210 of FIG. 3A is executing within runtime container 215 based on incoming requests from users (not shown) during productive operation. Persistency 220 stores data schema 222 and access schema 224 associated with current application 210. Data schema 222 includes table TABY, in addition to other unshown tables, and access schema 224 includes view TABY on table TABY, in addition to other unshown views on other tables.

Figure 3B:
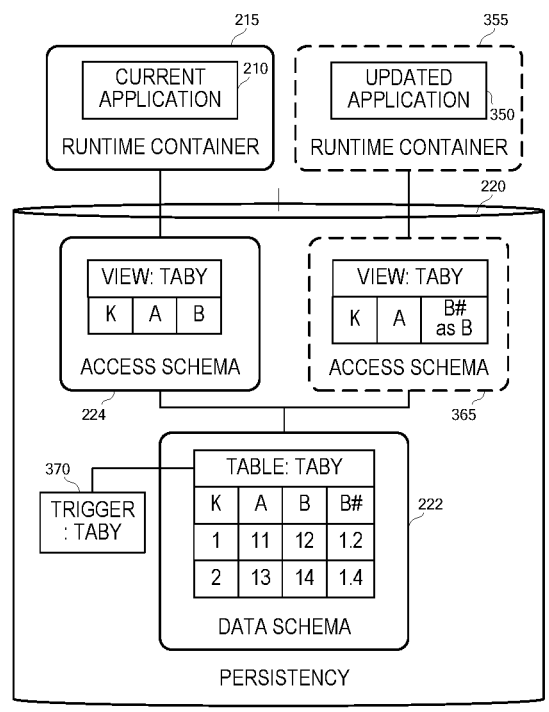

Updated application 350 changes a type of column B (e.g., to B#). In the example, B# is 0.1 of the value of B. Embodiments may include any conversion or transformation between data types. FIG. 3B illustrates extension of the data model in data schema 222 to satisfy the data model of updated application 350. As shown, the data model in data schema 222 is extended to add a column B# to table TABY.

FIG. 3B also shows preparation of new access schema 365 within persistency 220 and deployment of updated application 350 to runtime container 355. As described above, update of an application includes migration of existing data to corresponding columns and/or tables of an updated data model. Accordingly, column B# of table TABY is populated during the migration with appropriately-transformed values of its related column B. Moreover, database trigger 370 is activated to operate as will be described below.

FIG. 3C illustrates data schema 222 after continued execution of application 210, which has caused the addition of a row to table TABY. Since view TABY of access schema 224 does not reference column B# of table TABY, no value is included in column B# of the new record. However, trigger 370 operates to transform the value of B from any newly-added record to a corresponding value of B# and to store the corresponding value of B# in the record, as shown in FIG. 3D. Trigger 370 operates in this manner in a case that incoming requests are being received and served by current application 210, as is the case in FIGS. 3C and 3D.

It is then assumed that the migration of data is completed and any consistency checks are satisfied, resulting in redirection of incoming requests to updated application 350 executing within runtime container 355 as shown in FIG. 3E. Due to the operation of trigger 370, updated application 350 may access the records of table TABY which were added by application 210 before and after extension of the data model in data schema 222.

As shown in FIG. 3F, the incoming requests may cause application 350 to interact with view TABY of access schema 365. In the present example, this interaction results in the addition of a row to table TABY of data schema 222. Since access schema 365 points to columns K, A and B# of table TABY, the added record does not include a data value for column B.

In a case that incoming requests are being received and served by updated application 350 (as shown in FIG. 3F), trigger 370 operates to transform the value of B# from any newly-added record to a corresponding value of B and to store the corresponding value of B in the record. FIG. 3G illustrates such transformation and storage (i.e., of value 17) according to some embodiments.

In a case that reversion back to application 210 is desired due to an error or other reason, incoming requests may simply be redirected to current application 210 as shown in FIG. 3H. Advantageously, current application 210 may access the records of table TABY which were added during operation of updated application 350. Current application 210 may only access columns K, A and B of the added records, since those columns and not column B# are referenced by view TABY of access schema 224. In addition, trigger 370 may continue to operate to populate column B# of newly-added records of table TABY so that such records may be accessed by updated application 450 and access schema 465 (or patched versions thereof) if it is determined to attempt the update again.

FIGS. 4A through 4H illustrate update of a current application to an updated application which adds new records to a table during the update process according to some embodiments. FIGS. 4A through 4H illustrate update of current application 210 to updated application 450 according to some embodiments. Updated application 450 is intended to add new records to table TABZ during the update process.

Figure 4A:
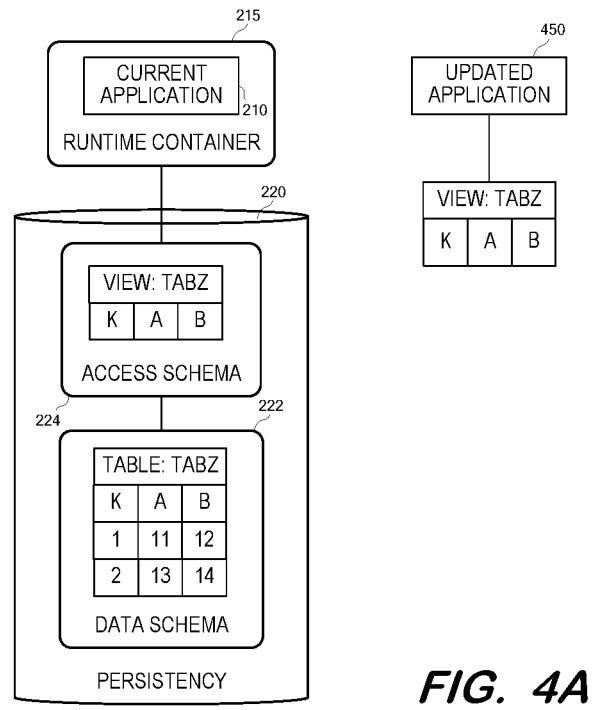
Figure 4B:
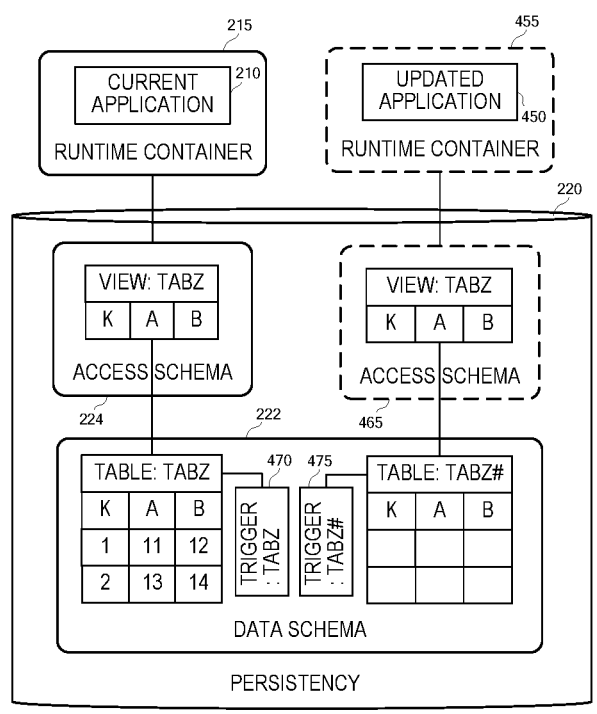

FIG. 4B illustrates extension of the data model in data schema 222 based on the data model required by updated application 450. In particular, data schema 222 is extended to add a "clone" table TABZ#. Access schema 465 is also prepared within persistency 220 and updated application 450 is deployed to runtime container 455. Database triggers 470 and 475 are respectively associated with each of tables TABZ and TABZ# and configured to operate as will be described below.

Figure 4C:
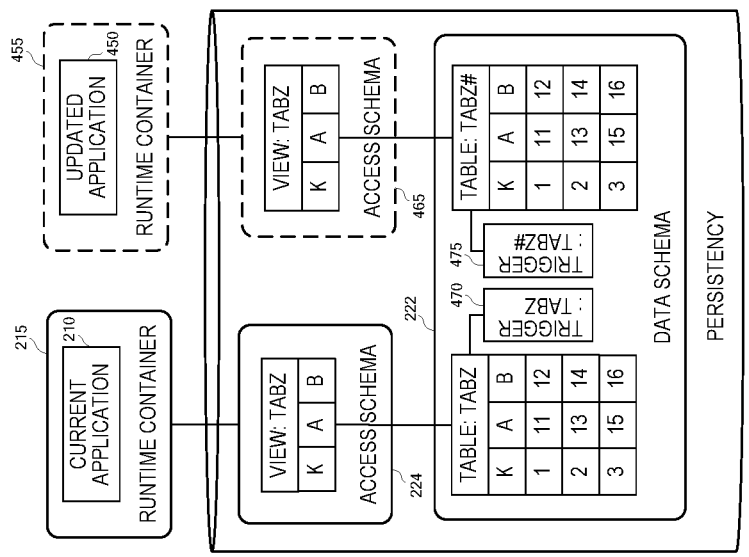
Figure 4D:
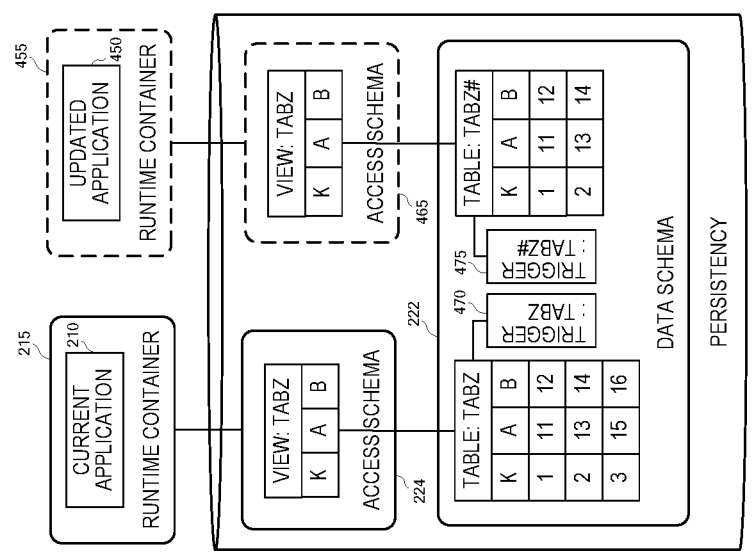
Figure 4E:
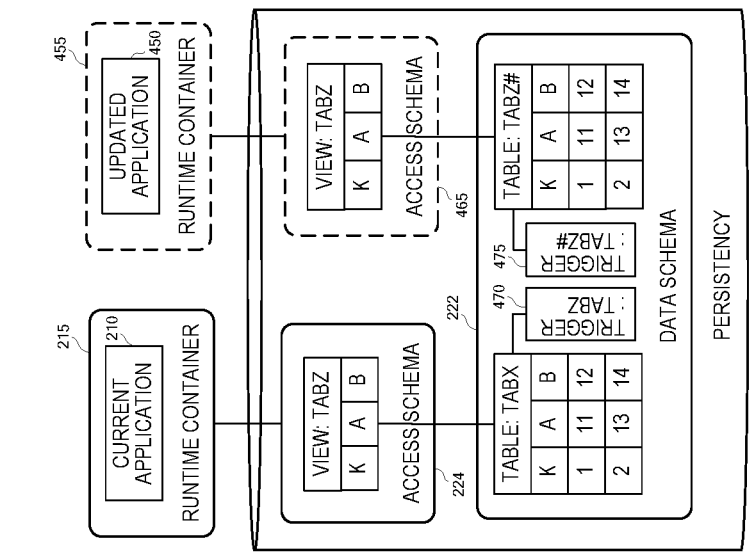

The data of table TABZ is migrated to table TABZ# during the above-mentioned initial data migration such that the data stored therein is identical, as shown in FIG. 4C. Continued execution of application 210 may result in a record being added to table TABZ, as shown in FIG. 4D. In response to addition of the record to table TABZ, database trigger 470 causes replication of the record in table TABZ#, as shown in FIG. 4E.

It is then assumed that incoming requests are redirected to updated application 450 executing within runtime container 455 as shown in FIG. 4F. FIG. 4F also shows the addition of a record to table TABZ# due to operation of updated application 450. In response to addition of the record to table TABZ#, database trigger 475 operates to replicate the added record in table TABZ, as shown in FIG. 4G. According to some embodiments, and to avoid entering an endless replication loop, trigger 475 replicates data to table TABZ only if incoming requests are being received and served by updated application 450 and trigger 470 replicates data to table TABZ# only if incoming requests are being received and served by current application 210.

FIG. 4H illustrates reversion back to current application 210. As shown, current application 210 may access the records of table TABZ which were replicated thereto during operation of updated application 450. Moreover, trigger 470 may continue to operate to replicate records to table TABZ in a case that it is decided to revert back to updated application 450 and access schema 465 or to patched versions of updated application 450 and access schema 465.

Figure 5:
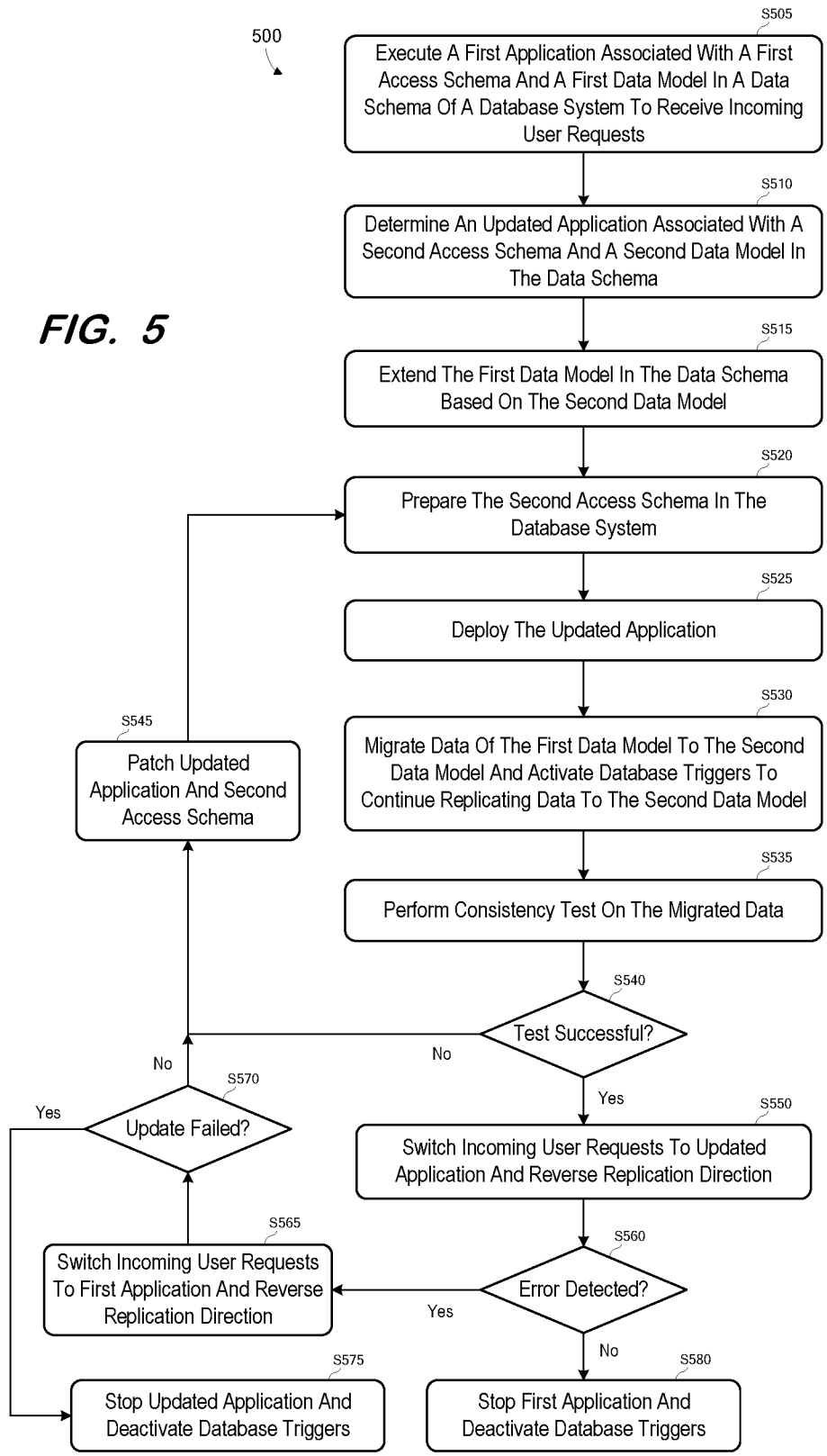
FIG. 5 is a flow diagram of a process to update a current application to an updated application according to some embodiments.

FIG. 5 illustrates process 500 to update a current application to an updated application according to some embodiments. Process 500 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Initially, at S505, a first application is executed to receive incoming user requests. The first application is associated with a first access schema and a first model in a data schema of a database system. The first application, first access schema and first data model in a data schema may comprise a production system which is deployed by an enterprise to service incoming user requests as described above with respect to FIG. 1A, for example. Execution of the first application to receive the user requests results in write statements which update data stored in the data schema.

Figure 6:
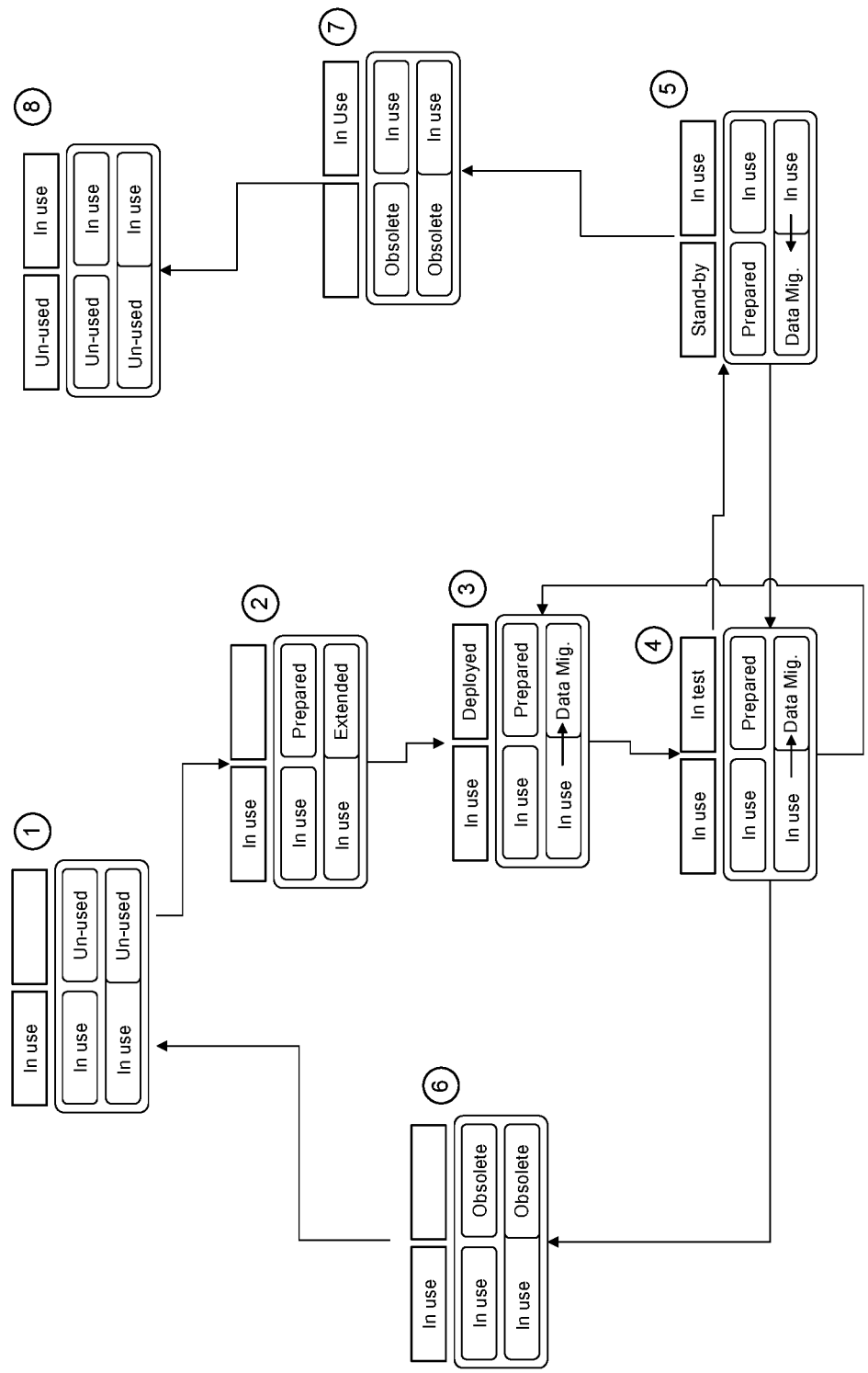
FIG. 6 is a diagram illustrating the states of current and updated applications, access schemas and data schemas during various stages of an update of a current application to an updated application according to some embodiments.

FIG. 6 is a diagram illustrating the states of current and updated applications, access schemas and data schemas during various stages of process 500 according to some embodiments. For example, State 1 represents execution (i.e., "in-use") of a first application in conjunction with a first access schema and a first data model in a data schema of a database system.

An updated application is determined at S510. The updated application may comprise an updated version of the first application, and is associated with a second access schema and a second data model for the data schema. At S515, the first data model in the data schema is extended based on the second data model. As described above, examples of such extension include but are not limited to adding a column to a database table, changing a type of a column, and/or cloning a table to accept new records generated by the updated application.

Next, at S520, the second access schema is prepared in the database system. The second access schema is prepared to allow the updated application to access the database tables of the extended data model in the data schema via projection views for each table in the data schema. State 2 of FIG. 6 represents the state of the update process after S520.

The updated application is deployed to a runtime container at S525. At S530, data of the first data model in the data schema is migrated to the second data model and database triggers are activated to replicate any new changes to the first data model to the second data model. The migration/replication may include transformation of data from a column of a table to another column of the table and/or migrating data to a cloned table as described above. S525 and S530 are represented by State 3 of FIG. 6.

A consistency test is performed on the migrated data at S535. A consistency test, for example, may include executing a test instance of the updated application to issue read statements to the second access schema and to analyze the result sets for consistency. Testing at S535 is represented by State 4, which illustrates that migration/replication may continue during the testing since the first application continues to service incoming requests and causing corresponding updates to the data of the data schema.

If it is determined at S540 that the test is not successful, the system may return to State 3. Specifically, the updated application and/or second access schema may be modified (i.e., patched) at S545 to correct any errors, with flow returning to S520 to prepare the patched second access schema and to S525 to deploy the patched updated application for testing thereof at S535.

If the test is successful, the incoming requests are switched to the updated application as represented by State 5. At State 5, the updated application, second access schema and second data model in the data schema are operated to serve the incoming user requests. As shown, the first application remains executing, although in a stand-by mode because it is not receiving user requests. Moreover, database triggers are activated to reverse the replication direction as described in the above examples. As described, such reversal ensures that the first data model remains up-to-date while incoming requests are being served by the updated application.

It will be assumed that an error is detected at S560, while the system resides at State 5. If so, the system is returned to State 4 by switching the incoming user requests back to the first application and by again reversing the direction of the replication at S565. At S570, it may be determined to continue with or abort the update process. If it is determined to abort the process, the updated application is stopped and the database triggers are deactivated at S575 to move the system to State 6. The updated application, the second access schema and the second data model in the data schema may then be discarded to return the system to State 1.

If it is determined at S570 to continue the update process, flow may return to S545 (i.e., State 3) and continue as described above. Alternatively, flow may return to State 5 to again attempt execution of the updated application.

In a case that no error is detected at S560, it may be determined to continue execution of the updated application. Accordingly, at S580, the first application is stopped and the database triggers are deactivated, as represented. Next, the first application, the first access schema and the first data model in the data schema may be discarded to move the system to State 8 and complete the update process. With reference to the example of FIGS. 3A-3H, S580 may include dropping column B from data schema 222 and maintaining column B#. Referring to the example of FIGS. 4A-4H, S580 may include dropping table TABZ from data schema 222 while maintaining table TABZ#.

According to some embodiments, the updated application may include a change or new feature which creates or uses data in a manner which is semantically different that the first application. Such "irreversible" changes or features may be toggled off during execution of the updated application at State 5, and toggled on once the state of the system advances to State 7. By toggling the features off at State 5, it remains possible to transition back to State 4 in which the first application executes. Moreover, the features may be toggled on at State 7 for testing, and toggled off prior to State 8 depending on the results of testing.

According to an example of the foregoing, it is assumed that a database system includes a table storing data and access control information. An updated application is available which adds a column to the table specifying whether or not the data of each record is only visible to a small audience of people with elevated access rights. The column may be named "top-secret" and newly-created records which are "top-secret" include "yes" in the column while other records include "no".

If the updated application is executed at State 5 to create records with the new column, and a rollback to State 4 is then executed, the new column is not visible to the first application and is not evaluated thereby. Accordingly, any records created by the updated application which include "yes" in the new column may be visible to all users having regular access to the table. The creation of "top-secret" records should therefore be toggled off at State 5, and only toggled on once the state transitions to State 7 because rollback from State 7 to State 4 is not possible.

If a problem associated with the feature occurs during execution of the updated application at State 7, the feature may be toggled off and all records in which "top-secret" is "yes" may be marked as unreadable by any user, independent of access rights. This approach prevents access to the records by any user until the feature is fixed, and allows access to the records by appropriate users once the feature is fixed and toggled on.

Figure 7:
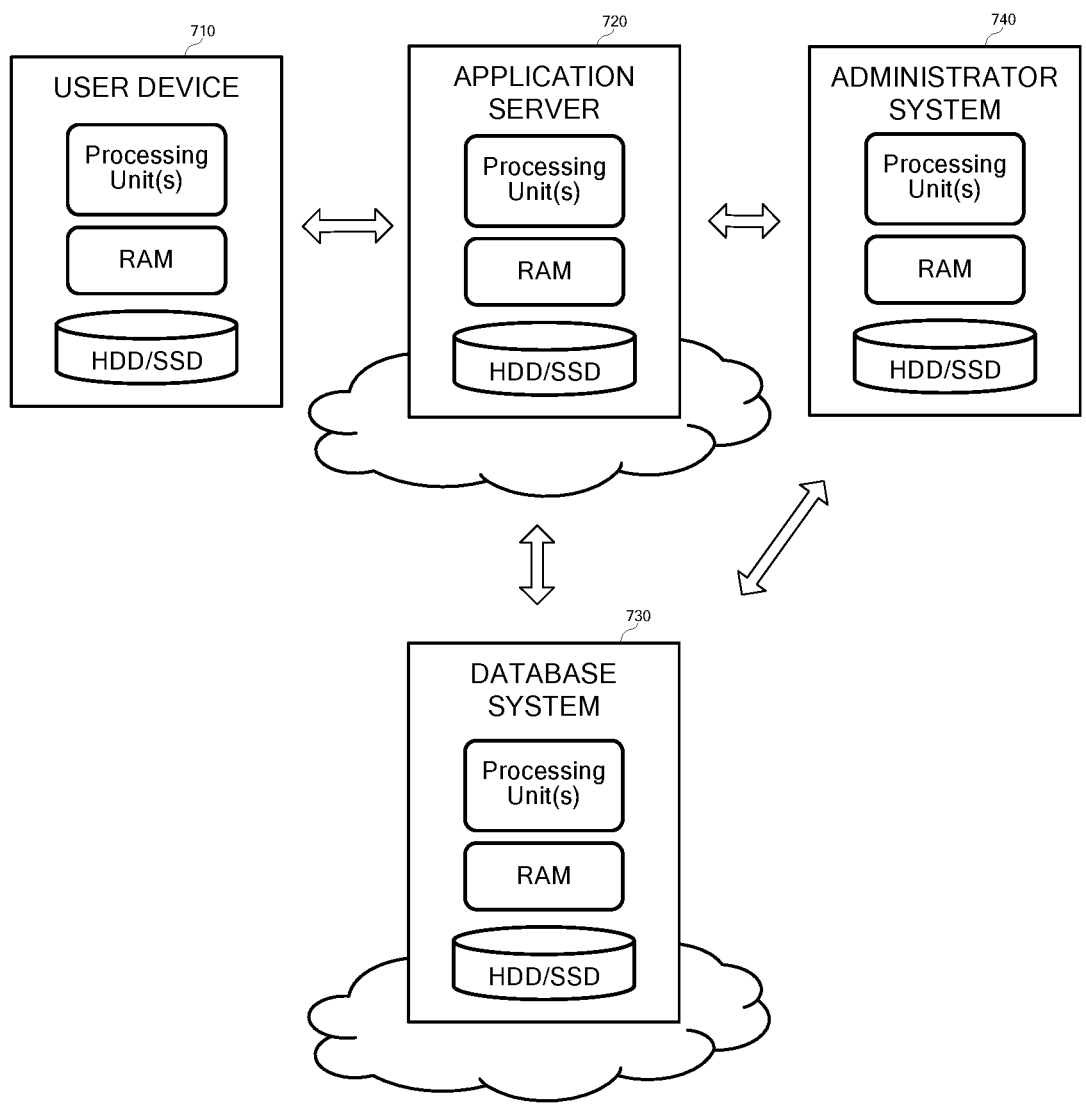
FIG. 7 is a block diagram of cloud-based servers of a system to update a current application to an updated application according to some embodiments.

FIG. 7 illustrates a cloud-based database deployment according to some embodiments. The illustrated components may comprise cloud-based compute resources residing in one or more public clouds providing self-service and immediate provisioning, autoscaling, security, compliance and identity management features.

User device 710 may interact with applications executing on application server 720, for example via a Web Browser executing on user device 710, in order to create, read, update and delete data managed by database system 730. Administrator system 740 may control a process to update an application executing on application server 720 to a new version as described herein. Such a control may require communication with database system 730 to prepare an access schema and extend a data model in a data schema based on the new version of the application as described herein.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable program code; and
at least one processing unit to execute the processor-executable program code to cause the system to:
execute a first application to receive incoming user requests, the first application associated with a first access schema and a first data model in a data schema of a database system;
while the first application is receiving incoming user requests:
extend the first data model in the data schema based on a second data model of a second application;
prepare a second access schema of the second application in the database system;
migrate data of the first data model in the data schema to the second data model;
execute a first one or more database triggers to replicate data of the first data model in the data schema to the second data model while the first application is receiving incoming user requests;
execute the second application; and
re-direct the incoming user requests to be received by the executing second application; and
while the second application is receiving incoming user requests:
execute a second one or more database triggers to replicate data of the second data model in the data schema to the first data model.

2. A system according to claim 1, wherein the at least one processing unit is to execute the processor-executable program code to cause the system to:
while the second application is receiving incoming user requests:
re-direct the incoming user requests to be received by the first application.

3. A system according to claim 2, wherein the at least one processing unit is to execute the processor-executable program code to cause the system to:
after re-directing the incoming user requests to be received by the first application,
modify the second application;
modify the second access schema of the second application in the database system;

migrate data of the first data model in the data schema to the modified second data model;
execute a third one or more database triggers to replicate data of the first data model in the data schema to the modified second data model while the first application is receiving incoming user requests; and
execute the modified second application; and
re-direct the incoming user requests to be received by the executing modified second application.

4. A system according to claim 2, wherein the at least one processing unit is to execute the processor-executable program code to cause the system to:
while the first application is receiving incoming user requests, delete the second access schema and the second data model in the data schema from the database system.

5. A system according to claim 2, wherein the incoming user requests are re-directed to be received by the first application in response to detection of an error associated with execution of the second application.

6. A system according to claim 1, wherein the at least one processing unit is to execute the processor-executable program code to cause the system to:
while the second application is receiving incoming user requests, delete the first access schema and the first data model in the data schema from the database system.

7. A system according to claim 6, wherein the at least one processing unit is to execute the processor-executable program code to cause the system to:
after deletion of the first access schema and the first data model in the data schema from the database system:
toggle on a feature of the second application;
execute the second application to generate records while the feature is toggled on; and
toggle off the feature and mark the records as unreadable.

8. A computer-implemented method comprising:
executing a first application associated with a first access schema and a first data model in a data schema of a database system;
while the first application is receiving incoming user requests:
extending the first data model in the data schema based on a second data model of a second application;
preparing a second access schema of the second application in the database system;
migrating data of the first data model in the data schema to the second data model;
replicating data of the first data model in the data schema to the second data model while the first application is receiving incoming user requests;
executing the second application;
re-directing the incoming user requests to be received by the executing second application; and
stopping the replication of data of the first data model in the data schema to the second data model; and
while the second application is receiving incoming user requests:
replicating data of the second data model in the data schema to the first data model.

9. A method according to claim 8, further comprising:
while the second application is receiving incoming user requests:
re-directing the incoming user requests to be received by the first application; and
stopping the replication of data of the second data model in the data schema to the first data model.

10. A method according to claim 9, further comprising:
after re-directing the incoming user requests to be received by the first application,
modifying the second application;
modifying the second access schema of the second application in the database system;
migrating data of the first data model in the data schema to the modified second data model;
replicating data of the first data model in the data schema to the modified second data model while the first application is receiving incoming user requests; and
executing the modified second application; and
re-directing the incoming user requests to be received by the executing modified second application.

11. A method according to claim 9, further comprising:
while the first application is receiving incoming user requests, deleting the second access schema and the second data model in the data schema from the database system.

12. A method according to claim 9, wherein the incoming user requests are re-directed to be received by the first application in response to detection of an error associated with execution of the second application.

13. A method according to claim 8, further comprising:
while the second application is receiving incoming user requests, deleting the first access schema and the first data model in the data schema from the database system.

14. A method according to claim 13, further comprising:
after deletion of the first access schema and the first data model in the data schema from the database system:
toggling on a feature of the second application;
executing the second application to generate records while the feature is toggled on; and
toggling off the feature and marking the records as unreadable.

15. A computer-readable medium storing processor-executable program code, the program code executable by a computing system to:
execute a first application associated with a first access schema and a first data model in a data schema of a database system;
while the first application is receiving incoming user requests:
extend the first data model in the data schema based on a second data model of a second application;
prepare a second access schema of the second application in the database system;
migrate data of the first data model in the data schema to the second data model;
replicate data of the first data model in the data schema to the second data model while the first application is receiving incoming user requests;
execute the second application;
re-direct the incoming user requests to be received by the executing second application; and
stop the replication of data of the first data model in the data schema to the second data model; and
while the second application is receiving incoming user requests:
replicate data of the second data model in the data schema to the first data model.

16. A medium according to claim 15, the program code executable by a computing system to:
while the second application is receiving incoming user requests:

re-direct the incoming user requests to be received by the first application; and stop the replication of data of the second data model in the data schema to the first data model.

17. A medium according to claim 16, the program code executable by a computing system to:

after re-directing the incoming user requests to be received by the first application, modify the second application;

modify the second access schema of the second application in the database system;

migrate data of the first data model of the data schema to the modified second data model;

replicate data of the first data model in the data schema to the modified second data model while the first application is receiving incoming user requests; and execute the modified second application; and re-direct the incoming user requests to be received by the executing modified second application.

18. A medium according to claim 16, wherein the incoming user requests are re-directed to be received by the first application in response to detection of an error associated with execution of the second application.

19. A medium according to claim 16, the program code executable by a computing system to:

while the second application is receiving incoming user requests, deleting the first access schema and the first model in the data schema from the database system.

20. A medium according to claim 19, the program code executable by a computing system to:

after deletion of the first access schema and the first data model in the data schema from the database system:

toggle on a feature of the second application;

execute the second application to generate records while the feature is toggled on; and toggle off the feature and marking the records as unreadable.

* * * * *